United States Patent [19]

Sato

[11] Patent Number: 4,807,231
[45] Date of Patent: Feb. 21, 1989

[54] MULTIPLEX COMMUNICATION METHOD

[75] Inventor: Morio Sato, Yokohama, Japan

[73] Assignee: Honda Giken Kogyo Kabushiki Kaisha, Japan

[21] Appl. No.: 21,345

[22] Filed: Mar. 3, 1987

[30] Foreign Application Priority Data

Mar. 8, 1986 [JP] Japan ................................. 61-50772
Mar. 8, 1986 [JP] Japan ................................. 61-50774

[51] Int. Cl.⁴ ............................................ G06F 11/10
[52] U.S. Cl. ...................................... 371/55; 371/49; 371/47
[58] Field of Search ................... 371/2, 5, 48, 47, 49, 371/55, 56, 57, 60, 62

[56] References Cited

U.S. PATENT DOCUMENTS

| | | | |
|---|---|---|---|
| 3,671,935 | 6/1972 | Lipp | 371/55 |
| 3,938,082 | 2/1976 | Schowe | 371/56 |
| 4,086,566 | 4/1978 | Lender | 371/56 |
| 4,208,650 | 6/1980 | Horn | 371/49 |
| 4,223,326 | 9/1980 | D'Amato | 371/49 |
| 4,337,457 | 6/1982 | Tache | 371/56 |
| 4,369,443 | 1/1983 | Giallanza | 371/49 |
| 4,464,765 | 8/1984 | Shimizu | 371/56 |
| 4,475,212 | 10/1984 | McLean | 371/56 |

Primary Examiner—Michael R. Fleming
Attorney, Agent, or Firm—Darby & Darby

[57] ABSTRACT

There is disclosed a multiplex communication method of transferring data between a plurality of nodes via a single signal line in a time sharing manner. The data transmitted from each of the nodes includes a start bit, data bits and a parity bit in a serial order. The data is associated with and interposed between a start signal and a stop signal. Each of the start bit, data bits and parity bit is composed of a forward half portion representing data contents and a rearward half portion representing a gap. Signal levels of the forward and rearward half portions of each bit are in inverted relation to each other. It is determining whether the signal levels of the forward and rearward portions of each bit of the data recieved by each of said nodes are in inverted relation to each other, thereby deciding that the received data is correct if such inverted relation is detected.

8 Claims, 9 Drawing Sheets

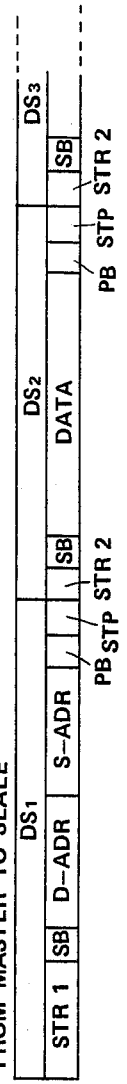
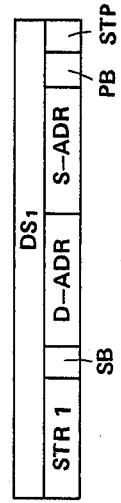
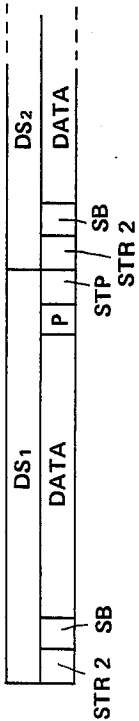
FIG. 4
(a) DATA SIGNALS ASYNCHRONOUSLY TRANSMITTED FROM MASTER TO SLAVE
(b) REQUEST SIGNAL FROM MASTER TO SLAVE
(c) DATA SIGNALS TRANSMITTED FROM SLAVE TO MASTER IN RESPONSE TO REQUEST

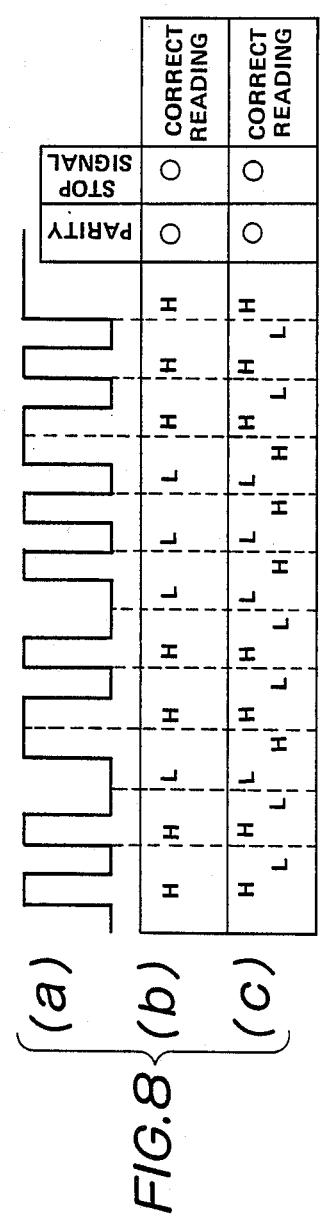
FIG.8 (a)(b)(c)
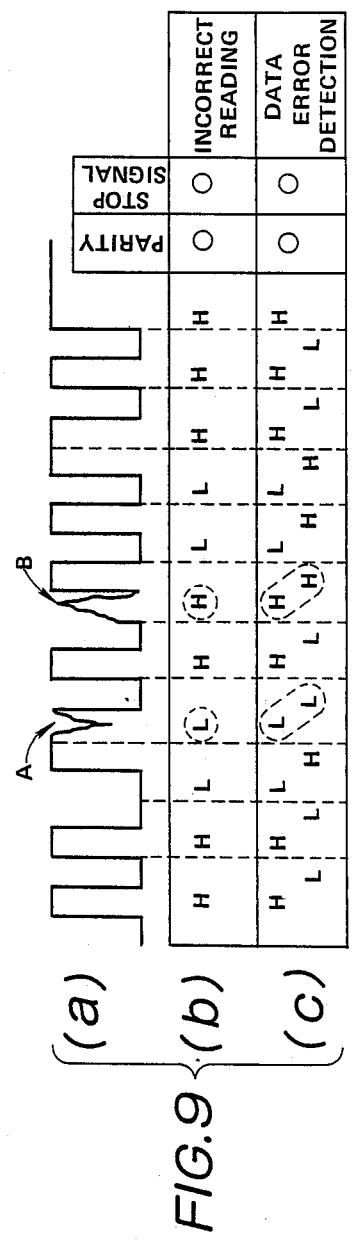
FIG.9 (a)(b)(c)

MULTIPLEX COMMUNICATION METHOD

BACKGROUND OF THE INVENTION

1. Field of the Invention

This invention relates to a multiplex communication method for use in a vehicle such as a motorcycle.

2. Related Art

It is preferred that a transmitter and receiver system to be installed on a vehicle should be simple in construction and lightweight. For this reason, it has been proposed a multiplex communication system of the type in which various transmitter and receiver units (or nodes) can be connected together through a single communication line so as to reduce the overall weight of the communication system.

FIG. 1 schematically shown such a multiplex communication system adapted to be installed on a vehicle 100 such as a motorcycle. The multiplex communication system in the form of a transceiver system comprises a radio receiver unit 101, an air suspension unit 102 for adjusting a road clearance of the vehicle 100, a first radio receiver control switch unit 103 to be operated by a driver or rider of the vehicle 100 for controlling the operation of the radio receiver unit 101, an air suspension control switch unit 104 to be operated by the rider for controlling the operation of the air suspension unit 102, a second radio receiver control switch unit 105 to be operated by a passenger of the vehicle 100 for controlling the operation of the radio receiver unit 101, and an indicator unit 106 indicating the condition of the operation of the radio receiver unit 101 as well as the condition of the operation of the air suspension unit 102.

The above units 101 to 106 have their respective input/output terminals 101a to 106a which are all connected to a common signal line or communication line 110. The transmission of information from one of the above units 101 to 106 to another is effected only through the common signal line 110. Thus, the multiplex communication system can be regarded as a LAN (Local Area Network) for effecting a mutual data transmission from one unit to another.

The above units 101 to 106 have digital microcomputers 111 to 116, respectively, each of which comprises a well-known transceiver section for serially outputting and receiving data signal DS for communication. As shown in FIG. 2, an output terminal 111a of the transceiver section of the microcomputer 111 contained in the radio receiver unit 101 is connected to a base of a transistor $Q_1$ via a resistor $R_{1-1}$, and a collector of the transistor $Q_1$ is connected to the single signal line 110 via the input/output terminal 101a of the unit 101 and is also connected to a source of positive voltage Vcc via a resistor $R_{2-1}$. An input terminal 111b of the transceiver section of the microcomputer 111 is connected to the collector of the transistor $Q_1$, and an emitter of the transistor $Q_1$ is grounded. The other units 102 to 106 are of the same construction as the unit 101.

The operation of the common signal line 110 will now be described.

When the signal at any one of the output terminals 111a to 116a of the microcomputers 111 to 116 is at a high level (H), the signal line 110 is grounded via the transistor Q of one of the units 101 to 106, so that the voltage of the signal line 110 is at a low level (L). And, when the signals at the output terminals 111a to 116a of the microcomputers 101 to 106 are all low (L), the voltage of the signal line 110 is high (H). Thus, with respect to the signal line 110, the low signal level is given a priority over the high signal level. More specifically, when the signal at any one of the input/output terminals 101a to 106a goes low (L), the voltage level of the signal line 110 is caused to go low (L) regardless of the state of the other input/output terminals.

The data signal DS sent through the signal line 110 will now be described. The data signal DS on the signal line 110 is of the start-stop type, and a format of such data signal DS is shown in FIG. 3. More specifically, the data signal DS includes a low-level start signal STR of 5.5 bits (in the case of the first start signal STR1), a start bit SB composed of a high-level signal or data D of 0.5 bit followed by a low-level gap G of 0.5 bit, 8-bit data portion (data bits), a parity bit PB composed of a parity signal or data D of 0.5 bit followed by a gap G of 0.5 bit, and a stop signal STP of 1 bit. Thus, the data signal DS is composed of 16.5 bits. The data portion may contain address data or text data, as later described, and each bit of the data portion is composed of 0.5-bit data D and 0.5-bit gap G. In this case, when the data D goes high, the gap G goes low, and vice versa. The reason why each bit of the data portion has 0.5-bit gap G is to enable an instantaneous determination of whether the signal line 110 is busy and an instantaneous determination of whether any collision of signals occurs on the signal line 110, that is to say, access to the signal line 110 is effected by more than one of the units 101 to 106 at the same time, as later described. Thus, the signal levels of the forward and rearward half portions D and G of each of the start bit SB, data bits and parity bit PB are in inverted relation to each other. When another one or more data signals DS are outputted onto the signal line 110 subsequently, these subsequent data signals DS has respective start signals STR of 1 bit (STR2, STR3, . . .), so that each subsequent data signal DS is composed of 12 bits.

Thus, when the data signal DS is outputted onto the signal line 110, that is to say, the signal line 110 is busy, a time period of the high voltage level (H) of the signal line 110 is one bit time at the maximum. Therefore, whether the signal line 110 is busy can be determined by determining whether the time period of the high voltage level of the signal line 110 is not less than 1.5-bit time. The data portion of the first data signal DS1 contains a destination address data D-ADD representative of an address of the one of the units 101 to 106 which should receive the data signal, and a source address data S-ADD representative of an address of the one of the units 101 to 106 which transmitted the data signal.

The radio receiver unit 101 and air suspension unit 102 which process a larger amount of data than the other units 103 to 106 serve as master units which dominate the transmission of the data signal from the other units 103 to 106. Thus, the units 103 to 106 serve as slave units. And, the communication between a pair of units is effected through the signal line 110 according to one of the following two procedures:

Transmission of data from a master unit to a slave unit is carried out in accordance with the first procedure of communication. FIG. 4(a) shows a format of the 1st, 2nd, 3rd, . . . and Nth data signals DS1, DS2, DS3, . . . DSn successively transmitted from the master unit 101, 102 to the slave unit or indicator unit 6, and these data signals DS are sent unilaterally to the indicator unit 6. As shown, the data portion of the first data signal DS1 contains the address data, and the data portions of the second to nth data signals DS2 to DSn contain text data DATA. This transmission is hereinafter referred to as "asynchronous communication".

Referring to the second procedure of communication, the master unit 101 controls the transmission of the data signal DS from the slave units 103 and 105 while the master unit 102 controls the transmission of the data signal DS from the slave unit 104. More specifically, first, the data signal DS or request signal to be transmitted to the slave unit or destination unit 103, 104, 105 and having a data format of FIG. 4(b) is outputted onto the signal line 110 by the master unit or source unit 101, 102. The data portion of the request signal DS contains the address data composed of destination address D-ADD and source address S-ADD. Then, the microcomputer of the destination slave unit detects the coincidence of the destination address D-ADD, contained in the request signal DS sent from the source or master unit, with the address thereof, and this destination slave unit transmits the successive response data signals DS1, DS2 ... DSn, which has a data format of FIG. 4(c), to the master unit or source unit designated by the source address contained in the above request signal. As shown, the data portions of the data signals DS1 to DSn contain text data DATA. This communication is hereinafter referred to as "synchronous communication". Thus, the master unit 101 controls the transmission of the data signal DS from the slave units 103 and 105, and the master unit 102 controls the transmission of the data signal DS from the slave unit 104. Therefore, the data signals are not freely sent to the master units 101 and 102 from their respective slave units, so that the processing of the master units 101 and 102 is not interrupted by the data signals from the slave units 103 to 105.

A collision of data on the signal line 110 occurs when more than one units send the respective data simultaneously. A mode of operation of avoiding such a data collision on the signal line 110 will now be described.

For example, as shown in FIG. 5, if the two master units 101 and 102 simultaneously send the data signal DS shown in FIG. 5(b) and the data signal DS shown in FIG. 5(c), respectively. With this system, when it is detected that the data signal DS outputted from any one of the units does not coincide in signal level with the data on the signal line 110, it is determined that a data collision occurs on the signal line 110. The two data signals DS outputted respectively from the master units 101 and 102 are equal in signal level to the signal on the signal line 110 until time $t_0$. A time $t_0$, the data signal DS from the master unit 101 is at the low level and is therefore given a priority over the data signal DS from the master unit 2 which is now at the high level, so that the voltage level of the signal line 110 is rendered low. Therefore, the master unit 102 detects the non-coincidence of the data signal sent therefrom with the data signal on the signal line 110, thereby deciding a collision of data on the signal line 110. As a result, the master unit 102 ceases to send the data signal while the master unit 101 continues to send the data signal. Such a data collision with respect to the master unit 101 is detected in the same manner.

Thus, the data collision is avoided, so that a data transfer among a plurality of units can be carried out via the single signal line or communication line.

In the multiplex communication system described above, when the data is to be received by one of the units or nodes, it is determined that such reception data is proper if the start signal STR and the stop signal ST are properly detected and if no parity errors exist in the reception data. Therefore, for example, if the forward half portions of an even number of bits of the signal data are inverted in signal level due, for example, to noises or the like, the parity error is not detected, and as a result it is erroneously determined that such reception data is correct.

Further, in the aforesaid multiplex communication system, when the units or nodes do not send the data signal onto the signal line, it can not be determined whether the unit actually does not need to transmit the data signal or the data-transmitting function of the unit is improper. Thus, such a malfunction of the unit can not be detected easily.

SUMMARY OF THE INVENTION

It is therefore an object of this invention to provide a multiplex communication method in which an error in data received by each of the units or nodes can be positively detected.

Another object is to provide such a method in which a transmission malfunction of each unit or node can be detected.

According to the present invention, there is provided a multiplex communication method of transferring data between a plurality of nodes via a single signal line in a time sharing manner; the data transmitted from each of said nodes including a start bit, data bits and a parity bit in a serial order; the data being associated with and interposed between a start signal and a stop signal; each of the start bit, data bits and parity bit being composed of a forward half portion representing data contents and a rearward half portion representing a gap; signal levels of the forward and rearward half portions of said each bit being in inverted relation to each other, said method comprising the step of:

(a) determining whether the signal levels of said forward and rearward portions of each said bit of the data received by each of said nodes are in inverted relation to each other, thereby deciding that said received data is correct if said inverted relation is detected.

BRIEF DESCRIPTION OF THE DRAWINGS

FIG. 4(a) is an illustration showing the format of the data signals in the asynchronous communication;

FIG. 4(b) is an illustration showing the format of the request signal in the synchronous communication;

FIG. 4(c) is an illustration showing the format of the data signals transmitted in response to the request signal of FIG. 4(b);

FIGS. 8a to 10c are diagrammatical illustrations of the received data, showing the data check according to the present invention and the prior art;

DESCRIPTION OF THE PREFERRED EMBODIMENTS OF THE INVENTION

A method of determining whether the data received by each of the units or nodes 101 to 106 is correct is now described with reference to the drawings. The invention is applied to the multiplex communication system shown in FIGS. 1 to 5, and therefore the invention will be described with reference to FIGS. 1 to 5 and the remainder of the drawings.

Figure 1:
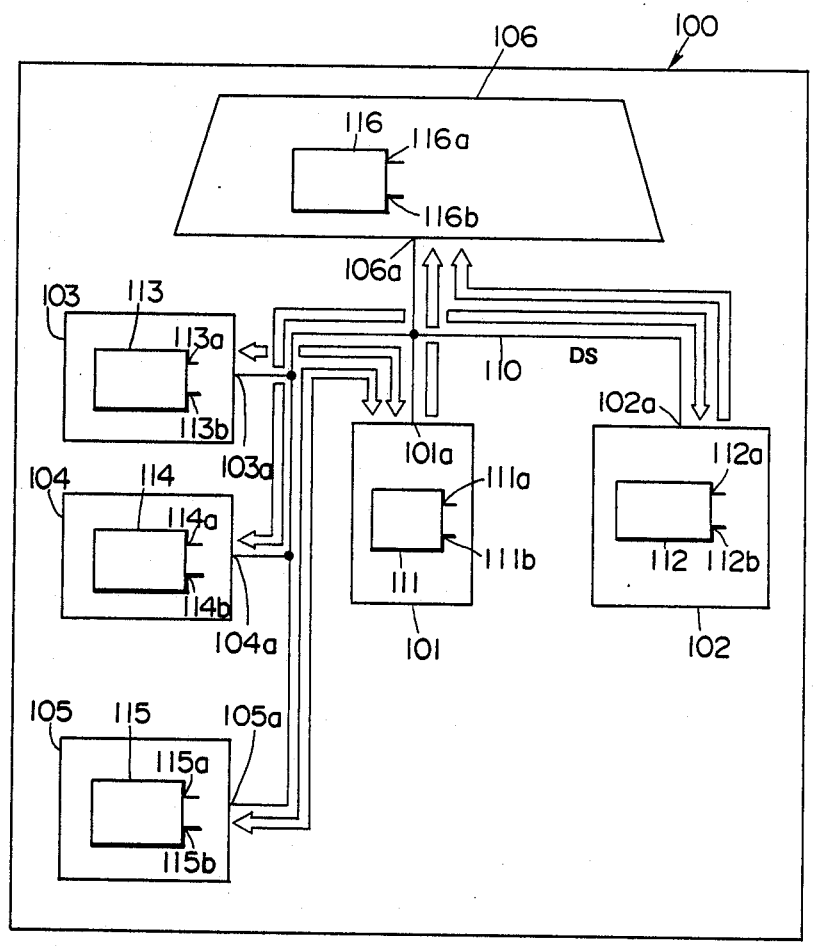
FIG. 1 is a block diagram of a multiplex communication system.
Figure 2:
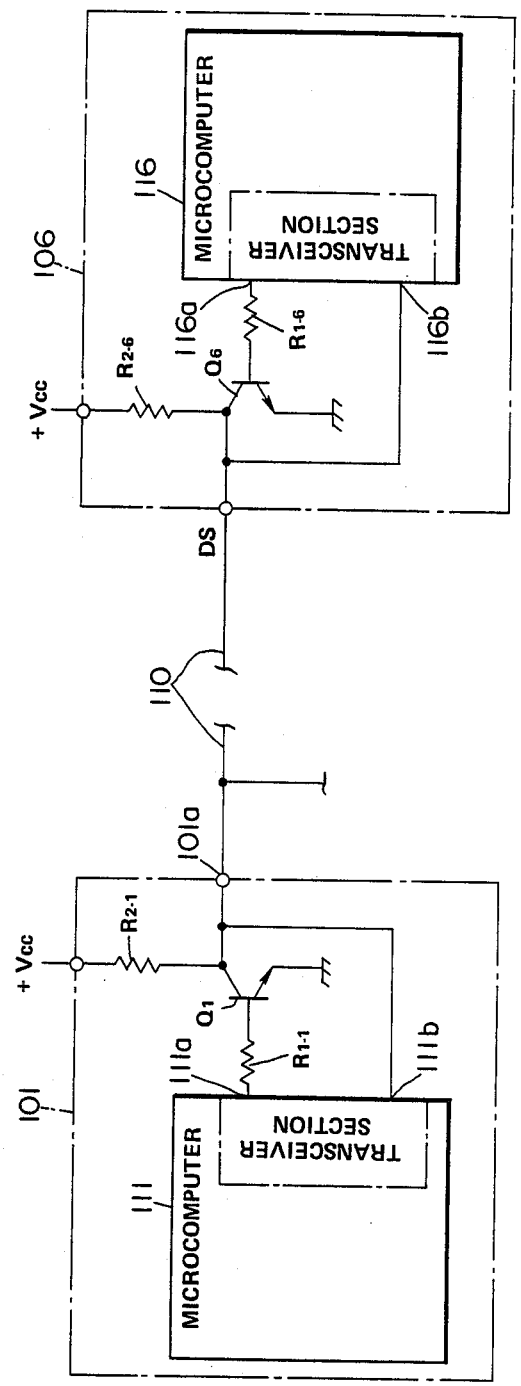
FIG. 2 is a circuit diagram of the respective units and the signal line of the system of FIG. 1.
Figure 3:
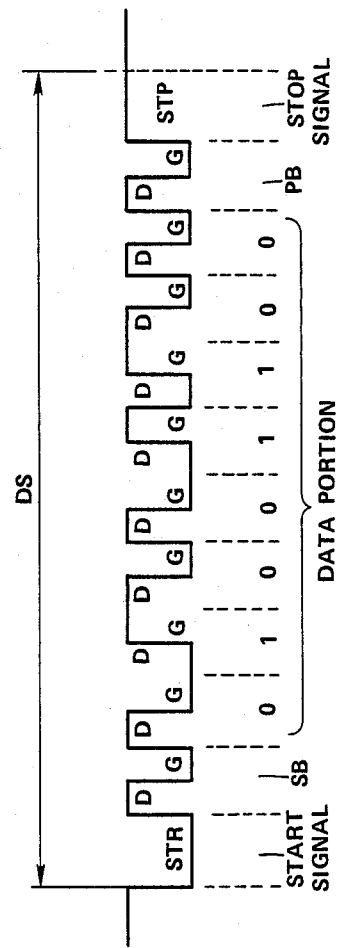
FIG. 3 is an illustration showing the format of the data signal DS outputted from each of the units of FIG. 1.
Figure 5:
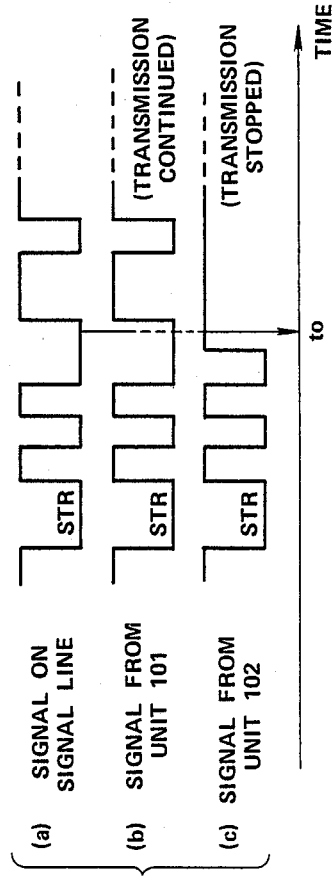
FIG. 5 is a time chart of two data signals simultaneously outputted from the units 101 and 102 and the signal appearing on the signal line.
Figure 6:
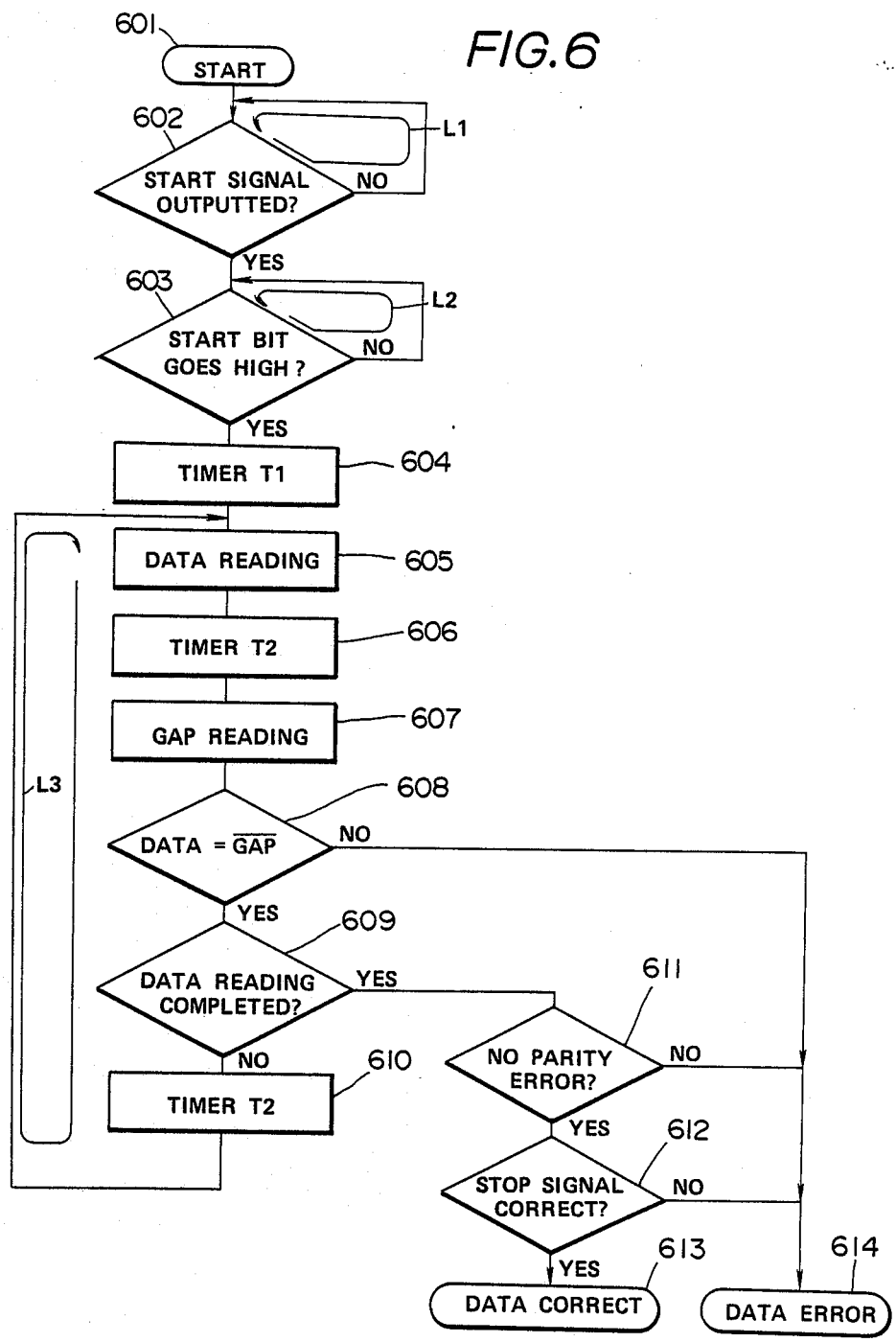
FIG. 6 is a flow chart of the procedure of receiving the data in accordance with the present invention.
Figure 7:
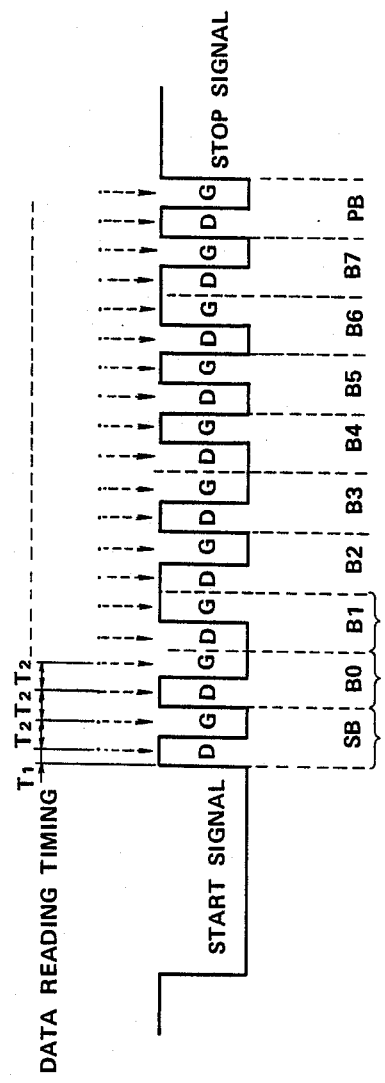
FIG. 7 is a timing chart of the data reading.

FIG. 6 shows a flow chart of a program executed by each of the microcomputers 111 to 116 for determining whether the data received by each of the units 101 to 106 is correct. In Step 601, the processing is started. Then, in Step 602, it is determined whether the start signal STR is outputted on the signal line 110. The processing is circulated as indicated in a loop L1 until the result in Step 602 becomes "YES". If the result becomes "YES" in Step 602, the processing proceeds to Step 603 in which it is determined whether the start bit SB goes high. If the result is "NO", this processing is repeated as indicated in a loop L2 until the result becomes "YES". Then, the processing proceeds to Step 604 in which a time interval T1 is allowed to lapse by an interval timer. Then, in Step 605, the reading of the data (the start bit SB, the data bits and the parity bits PB) is carried out. The interval timer is associated with the microcomputer 111 to 116. The time interval T1 is a time period corresponding to one fourth of one bit from the leading edge of the start signal STR, as shown in FIG. 7. Since the time interval T1 is predetermined to one fourth of one bit, the reading of the data in Step 605 is carried out substantially in the middle of the forward half portion D of the start bit SB representing its contents. As a result, a timing of the data reading is stable.

Next, in Step 606, a time interval T2 is allowed to lapse by an interval timer associated with the microcomputer, and then the processing proceeds to Step 607 in which the contents of the gap G is read. The time interval T2 is predetermined to a time period corresponding to 0.5 bit, as shown in FIG. 7, so that the reading of the data or gap contents is carried out substantially in the middle of the gap G in a stable manner. Then, in Step 608, it is determined whether the contents of the data (i.e., the forward half portion D of the bit) and the contents of the gap G (i.e., the rearward half portion of the bit) have opposite or inverted signal levels. If they have the inverted signal levels (YES), the processing proceeds to Step 609 in which it is determined whether the reading of all the data (i.e., all the forward and rearward half portions D and G) of the received data signal DS is completed. If the result is "NO", the processing proceeds to Step 610 in which a time interval T2 is again allowed to lapse, and thereafter processing returns to Step 605. And, this processing is repeated as indicated in a loop L3 so long as the result in Step 608 continues to be "YES" and the result in Step 609 continues to be "NO". And, the data reading is carried out at the time interval T2 as shown in FIG. 7, so that the data reading is stably effected in the middle of either the forward half portion D or gap G of each bit.

If the proper data is received by the unit or node, the forward and rearward portions D and G of each bit always have the opposite or inverted signal levels. Therefore, the result will never become "NO" in Step 608, and the processing is circulated in the loop L3 until the data of the data signal DS is entirely read. Then, when the result becomes "YES" in Step 609, the processing proceeds to Step 610 in which the parity check is carried out. If the parity is correct, then the processing proceeds to Step 611 in which it is determined whether the stop signal STP is correct. If the result is "YES", the processing is terminated in Step 613. On the other hand, if the result is "NO" in Step 608, Step 611 or Step 612, it is decided that the data read or received is not correct (Step 614).

Whether the reception data received by each of the units 101 to 106 is correct is checked according to the above procedure. Differences between the method of checking the reception data according to the present invention and the method of checking such a reception data according to the prior art will now be described. Let's assume that the reception data is correct as shown in FIG. 8(a). Then, in the data checking method according to the prior art (FIG. 8(b)), the reception data is decided to be correct since the parity and the stop signal STP are both proper. And, in the data checking method according to the present invention (FIG. 8(c)), the reception data is also decided to be correct since the inverted signal level relation between the forward and rearward portions of each bit, the parity and the stop signal STP are all proper.

Next, the case where noises are present in the portions A and B of the reception data, as shown in FIG. 9(a), will now be described. In this case, although the portion A should be at the high level, its level is rendered low due to the noise. And, although the portion B should be at the low level, its level is rendered high due to the noise.

In the presence of the above noises, the data signal DS is render low at the portion A and is rendered high at the portion B, and therefore the parity of the data (even parity checking) is not changed, so that it is decided that no parity error exists. In the data checking method according to the prior art, it is decided that the reception data is proper if the parity and the stop signal are correct, as shown in FIG. 9(b). Thus, in such a case, the data error can not be properly checked.

On the other hand, in the data checking method according to the present invention, it is detected that the signal level of the portion A is not in inverted relation to the signal level of the gap G following the portion A. Therefore, the result in Step 608 of the processing shown in FIG. 6 becomes "NO", thereby uncovering the data error at this stage. Therefore, the data will never be read erroneously, and the data error detection can be carried out at an early stage.

Figure 10:
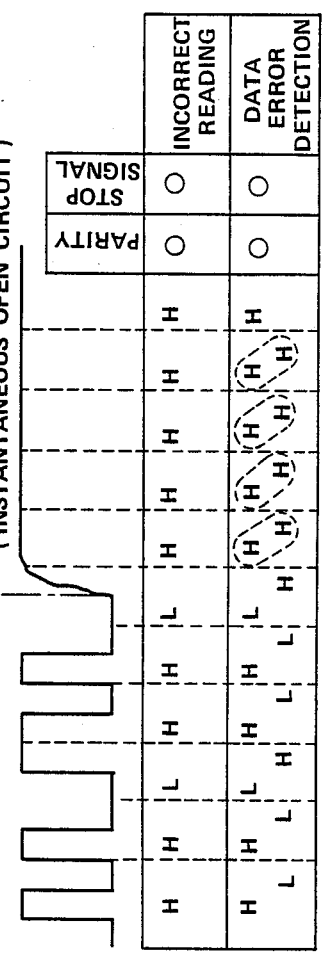

Next, let's assume that the signal line 110 is instantaneously opened due to an imperfect electrical connection of a connector of the signal line, so that the signal level of the data signal DS is maintained at the high level after time t1, as shown in FIG. 10(a). In this case, also, in the data checking method according to the prior art, the reception data is decided to be correct since the parity and the stop signal are correct. On the other hand, in the data checking method according to the present invention, it is detected that the forward half portion D and rearward half portion (gap) G of the bit immediately after the time T1 are both at the high level, thereby detecting the data error. Thus, according to the present invention, a data error can be positively detected without fail.

According to the present invention, there is also provided a method for determining whether the data-transmitting function of the units (nodes) is performed properly. This method will now be described with reference to FIGS. 11 and 12.

In the case of the asynchronous communication, each of the units or nodes 101 and 102 transmits the data signals at a predetermined time interval T as shown in FIG. 11(a). And, in the case of the synchronous communication, each of the units 101 to 105 transmits the response data signal at a predetermined time interval T as shown in FIG. 11(b). In the asynchronous communication, when the data is not changed, the same data signal is transmitted again, and when the data is changed, the data signal containing the changed data is transmitted. In the synchronous communication, when the unit or node does not receive a request signal, this unit transmits the same data signal as the response data signal which the unit precedingly transmitted, and when the unit receives another request data signal, the unit transmits another response data signal to the master unit designated by the source address contained in the request data signal. The time interval T is predetermined to a time period much longer than a time period of the transmitting of the data signal by each of the units 101 to 105. Therefore, the transmitting and receiving of the data signals by all the units are completed within the time interval T.

Figure 12:
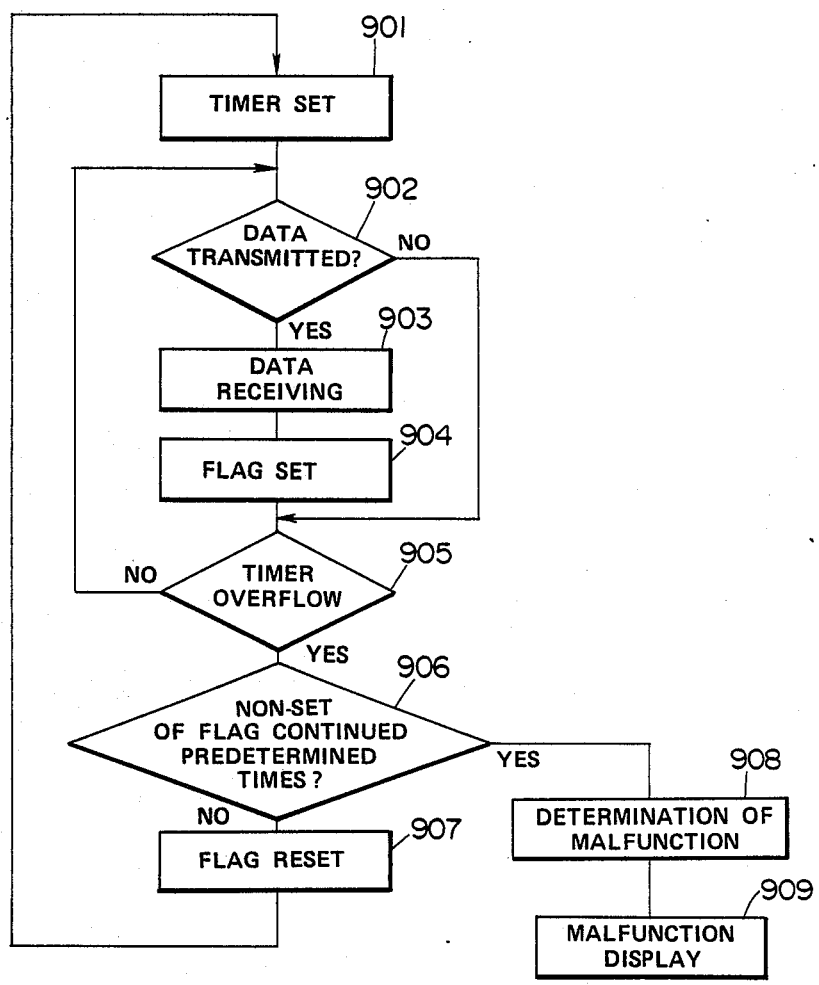
FIG. 12 is a flow chart of the procedure of determining the transmission malfunction.

At those timings when each of the units does not transmit the data signal, the microcomputer of the unit monitors the data signal on the signal line 110 in a manner as shown in a flow chart of FIG. 12. The program executed by the microcomputer to perform this monitoring will now be described with reference to FIG. 12. The microcomputer 111 to 116 of each unit or node includes a register in which there are provided data-receiving flags corresponding respectively to its source units.

First, in Step 901, a timer associated with the microcomputer 111 to 116 is set. This timer serves to measure the time interval T. Then, in Step 902, it is determined whether there is any data signal sent onto the signal line 110. If the result is "NO", the processing proceeds to Step 905 in which it is determined whether the timer finishes the measuring of the time interval T. If the result is "NO", the processing returns to Step 902.

On the other hand, if the result in Step 902 is "YES", the processing proceeds to Step 903 in which the data on the signal line 110 is read, so that the source unit is determined from the data thus read. Then, in Step 904, the data receiving flag corresponding to the source unit, is set. Then, in Step 905, it is determined whether the timer finishes the measuring of the time interval T, and if the result is "NO", the processing returns to Step 902, as described above.

Next, when the timer finishes the measuring of the time interval T, so that the result in Step 905 becomes "YES", the processing proceeds to Step 906 in which it is determined whether there is any data-receiving flag which has not been set a predetermined number of consecutive preceding executions of Step 906. If the result is "YES", it is decided in Step 908 that the unit corresponding to the data-receiving flag which has not been set the predetermined consecutive number of times is improper in its data-transmitting function. The determination of such a transmitting malfunction in Step 906 is carried out with respect to each of the source units. Then, in Step 909, the unit whose determination result of Step 906 is "YES" is displayed to be improper in transmitting function.

On the other hand, if the result of Step 906 is "NO", the processing proceeds to Step 907 in which the data-receiving flag is reset. Then, the processing returns to Step 901, and the above procedure is repeated.

In the above processing, when any one of the source units does not transmit the data signal during the time interval T, the data-receiving flag corresponding to it is not set. There are two such cases. In one case, the one source unit is subjected to a transmitting malfunction. In the other case, when the one source unit is going to transmit the data signal, another source is already transmitting the data signal. In other words, the transmission of the data signal by the one source unit is on stand-by when said another source unit is transmitting the data signal. And, the source unit begins to transmit the data signal when said another source unit ceases to transmit the data signal. Therefore, the transmission of the data signal by the one source unit is not carried out within the time interval T, in which case when the unit monitoring this source unit executes Step 902 the next time, the result of Step 902 becomes "YES" when this Step is executed for the second time. As a result, the data-receiving flag corresponding to the source unit is set in Step 904. Thus, so long as the source unit is not subjected to a transmission malfunction, the non-set condition of the data-receiving flag will not be detected consecutively. As described above, Step 906 is to determine whether the unit is subjected to a transmitting malfunction, and if the non-set condition of the data-receiving flag corresponding to the source unit is continued a predetermined consecutive number of times, it is determined in Step 908 that this source unit is subjected to a transmitting malfunction.

Figure 11:
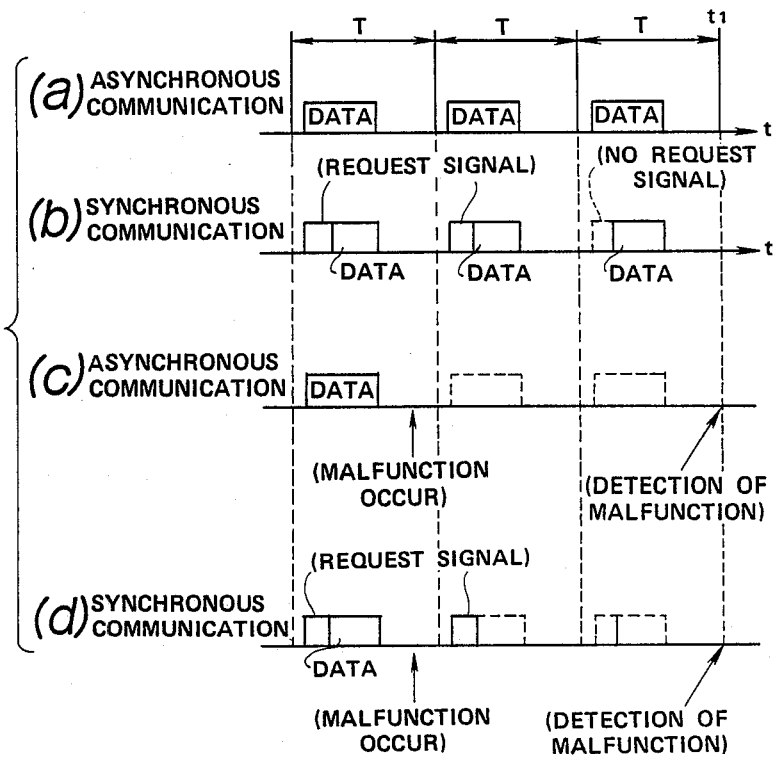
FIGS. 11a–11d are a time chart of the data transmission according to a procedure of determining a transmission malfunction of each unit.

Therefore, if the above predetermined consecutive number of times is, for example, two times, it is determined at time t1 (FIG. 11-(c)) in both the asynchronous and synchronous transmissions that the unit is improper in transmitting function.

In the flow chart of FIG. 12, the processing is divided into Step 907 and Steps 908, 909. Actually, however, the execution of Step 907 and the execution of Steps 908 and 909 are carried out in a time sharing manner. For example, if Steps 908 and 909 are executed with respect to those units corresponding to the respective data-receiving flags which are determined not to have been set the predetermined consecutive number of times in Step 906. And, Step 907 and the subsequent Steps are executed with respect to those units which are determined to be "NO" in Step 906.

The communication system may be so arranged that no contention occurs, in which case the monitoring program is modified such that if even one non-set condition of the data-receiving flag is detected, it is determined that the unit corresponding to this data-receiving flag is subjected to a transmission malfunction.

What is claimed is:

1. A multiplex communication method of transferring data between a plurality of nodes via a single signal line in a time sharing manner; the data transmitted from each of said nodes including a start bit, data bits and a party bit in a serial order; the data being associated with and interposed between a start signal at a first level and a stop signal at a second level; each of the start bit, data bits and parity bit being composed of a forward half portion representing data contents and a rearward half portion representing a gap; signal levels of the forward and rearward half portions of said each bit being in inverted relation to each other, said method comprising the step of:

coupling said nodes to said signal line through means which transmits a signal having said first level and blocks a signal having said second level, in the event that a signal at a node is not the same as the signal on said signal line, determining whether the signal levels of said forward and rearward portions of each bit of the data at each of said nodes are in inverted relation to each other and deciding that said data at each node is correct is said inverted relation is detected.

2. A multiplex communication method according to claim 1, further comprising the step of detecting the start signal when the data associated with said start signal is received by each of said node.

3. A multiplex communication method according to claim 1, comprising the step of detecting the signal levels of the forward and rearward half portions of each said bit of the data received by each of said nodes.

4. A multiplex communication method according to claim 1, further comprising the steps of detecting the start signal and the stop signal associated with the data at each of the said nodes; and detecting whether there is no parity bit error in said received data.

5. A multiplex communication method according to claim 1, further comprising the steps of:
(a) causing each of said nodes to transmit the data at a predetermined time interval; and
(b) causing each node to monitor the data on the signal line at those timings when said node does not transmit the data, and determining whether the other nodes have transmitted the data onto the signal line within said time interval, thereby deciding that those of said other nodes which have not transmitted the data within said time interval is subjected to a transmitting malfunction.

6. A multiplex communication method according to claim 5, in which it is decided that when those of said other nodes which have not transmitted the data a predetermined consecutive number of times at said time intervals, said those nodes are subjected to a transmitting malfunction.

7. A multiplex communication method according to claim 5, in which the detection of the transmitting-malfunction of said those nodes is carried out in a time sharing manner.

8. A multiplex communication method according to claim 5, in which when more than one node transmit the data onto the signal line at the same time, one node is caused to stop the data transmission while the other is allowed to continue to transmit the data.

* * * * *